Oct. 6, 1959
T. O. LILLQUIST
2,907,892
POWER TRAIN CONTROL
Filed Dec. 17, 1956
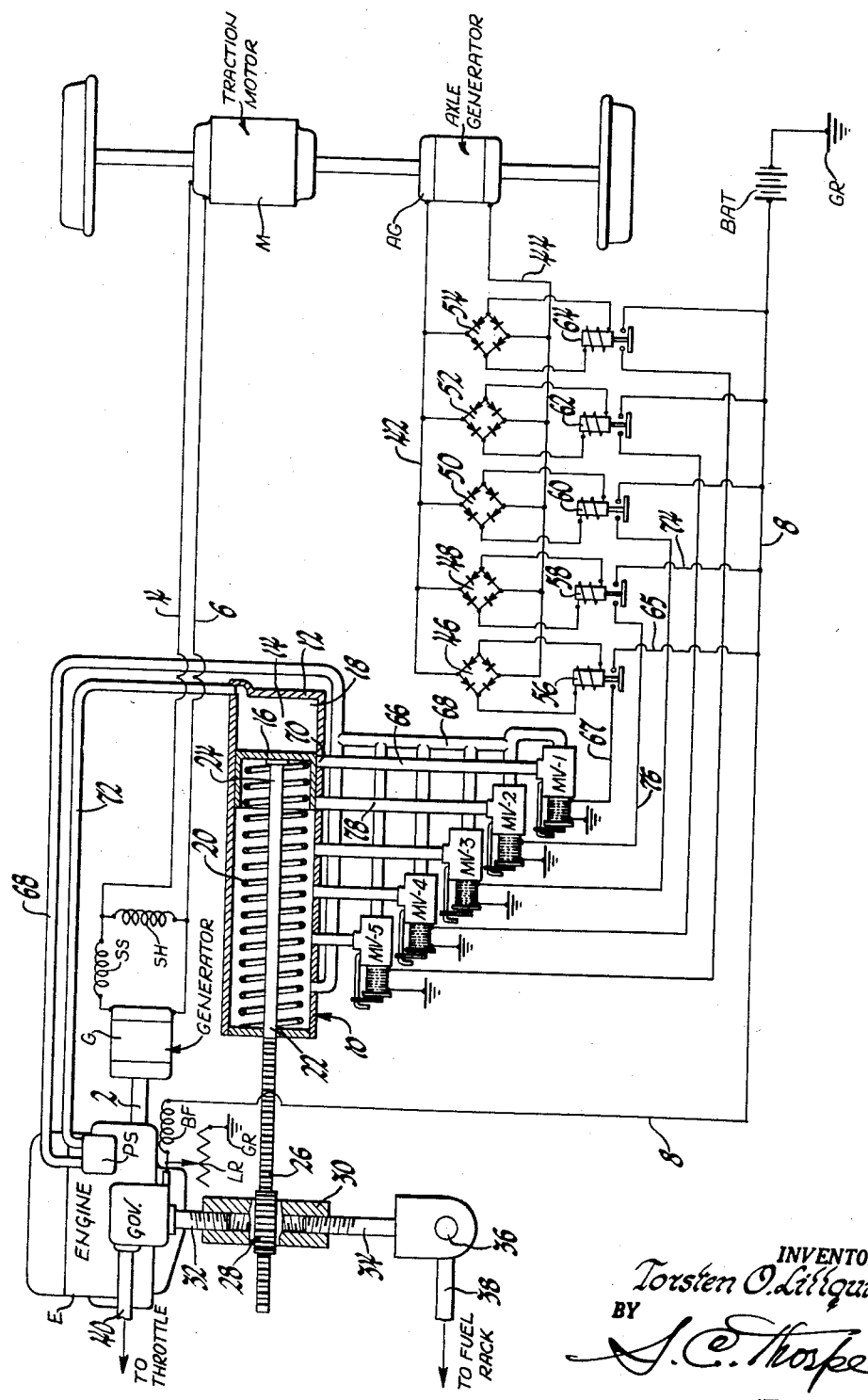
INVENTOR.
Torsten O. Lillquist
BY
ATTORNEY

United States Patent Office 2,907,892
Patented Oct. 6, 1959

2,907,892

POWER TRAIN CONTROL

Torsten O. Lillquist, La Grange, Ill., assignor to General Motors Corporation, Detroit, Mich., a corporation of Delaware Application December 17, 1956, Serial No. 628,783

1 Claim. (Cl. 290—17)

This invention relates generally to power transmissions and more particularly to controls for the combination of an electrical power generating means and an electrical power using means connected thereto which regulates the output of the power generating means in response to the rate of the power using means, so as not to exceed limitations of the power using means. The invention although not limited thereto is particularly adaptable for use in diesel electric locomotives.

In recent years the horsepower of diesel electric locomotives has been substantially increased. This horsepower is ordinarily absorbed by either four or six traction motors wherein either two or three of the motors are provided in each of two locomotive trucks, depending upon whether four or six motors are desired. The large amounts of engine horsepower output to these traction motors at full or near full throttle has been found to be too great at certain traction motor (locomotive) speeds which are below the continuous ratings of the motors. Such a condition has resulted in over-heating of the motors and excessive wheel slip of the wheels connected thereto. It is, therefore, an object of this invention to provide a control system that automatically reduces the horsepower output of the engine when required at full throttle position without affecting the engine speed and so as to prevent overheating of the motors and the occurrence of wheel slip of the wheels connected thereto at motor speeds less than the speeds at which they are continuously rated.

The present invention proposes to achieve the above object by the provision of means which is sensitive to the speed of the traction motors to regulate and control the power output of the prime mover regardless of its throttle position, so that the power output of the prime mover does not exceed the power using characteristics of the traction motors beyond the point at which excessive heating of the motors and wheel slip might occur.

For a fuller understanding of the invention and the objects thereof, reference may be made to the accompanying detailed description in conjunction with the drawing which represents a schematic diagram of the proposed control system.

Referring now to the drawing, a prime mover, which may be of any type of power generating means but in this case is a diesel engine, is indicated by the letter E. The engine E is provided with a governor GOV which is conventional and includes the usual power piston found in such governors for regulating the engine power output in accordance with engine throttle setting. The engine E has coupled thereto by shaft 2 a main generator G which is provided for three exciting windings, a shunt field SH, a series field SS, and a separately excited battery field BF. Operatively connected across the generator armature by transmission lines 4 and 6 is an electrical traction motor M which is of the series type most commonly used on vehicles of this character. It will be observed that the battery field BF receives its energization from a battery BAT having one side thereof grounded at GR and the opposite side connected by a wire 8 to battery field BF and through a load regulator LR, again to ground GR. The load regulator LR is a conventional device normally found on diesel electric locomotives and is controlled through the governor to regulate the resistance in circuit with the battery field so as to maintain the power output of the generator G relatively constant for any given throttle setting of the engine E. As previously indicated herein, there are occasions particularly when the vehicle is being propelled at relatively slow speeds when the traction motor M is turning at speeds below the continuous rating of the motor for the horsepower output of the engine established by a given throttle setting; for example, full throttle or any of the higher throttle settings. Under such conditions the traction motor is likely to be damaged by excessive heat generated by the excess motor current or else extremely undesirable wheel slip conditions may occur causing rapid wear of both the wheels and the rails and possible runaway of the motor.

In order to protect the motor and other equipment under the conditions set forth above and yet automatically make the full power of engine E available to the motor M when it is operating at speeds equal to or above its continuous rating motor speed, a unique control has been provided which comprises in general a speed sensitive means indicated by an axle generator AG and a hydraulic servo indicated generally by a numeral 10 whose actuation is determined by the output of the axle generator AG.

Referring for a moment to the servo 10, it will be observed that it comprises a housing 12 forming an inner cylindrical chamber 14. Located in the chamber 14 for reciprocation therein is a piston 16. The piston is biased toward an end 18 of chamber 14 by means of a helical coil spring 20. The piston 16 is connected to an operating shaft or rod 22 at one end 24 of the rod. The opposite end of the rod has a rack 26 formed thereon which meshes with a pinion or small gear 28 splined or keyed to a turnbuckle nut 30. Nut 30 at its upper end as viewed in the drawing is provided with right hand threads and at its lower end with left hand threads so that when it is turned by pinion or gear 28 and rack 26 the ends of a pair of threaded rods or shafts 32 and 34, respectively, are drawn closer together or moved further apart depending upon the direction of rotation. This latter operation or movement has the effect of changing the effective length of the linkage leading from the governor to the fuel rack so as to control the supply of fuel to the engine E and consequently its power output. The rod 34 is shown diagrammatically as being connected by a suitable pivot connection 36 by means of a link 38 to the engine fuel rack. Also shown diagrammatically is a rod or shaft 40 which leads from throttle to the governor to adjust the power piston of the governor and through the linkage 30, 32 and 34, the fuel to the engine E. Except for the addition of the turnbuckle 30, gear 28 and rack 26, the linkage leading from the throttle to the governor to the fuel rack is conventional and operated in conventional manner to control the horsepower output of the engine by setting the throttle in any plurality of power positions. However, the addition of the turnbuckle changes the action of the throttle through the governor on the fuel rack setting and consequently the horsepower output of the engine. In the example shown, if the turnbuckle shortens the linkage 30, 32 and 34, in response to vehicle (motor M) speed, it will have the effect of increasing engine power up to the full horsepower normally obtained with full throttle setting. However, if the linkage 30, 32 and 34 is increased in response to vehicle (motor M) speed, it will have the effect of decreasing engine power when the throttle is in the full throttle position so that the engine power will not cause the motor M to slip or its rating to be exceeded.

The effective length of the linkage 30, 32 and 34 and consequently the power output of the engine E is regulated by the servo motor 10 in response to the speed of the traction motor by the novel control now to be described.

As previously indicated a permanent magnet AC axle generator AG is used to sense the speed of the vehicle or motor M although any other device whether centrifugal, hydraulic, pneumatic, or electrical, can be used to actuate the hydraulic control piston and rack as long as it is speed responsive. The output of the axle generator AG which occurs over transmission lines 42 and 44 is rectified by a plurality of full wave rectifiers 46, 48, 50, 52, and 54. The output of full wave rectifier 46 corresponds to a relay 56 and energizes the relay to cause its interlock to close. Rectifiers 48, 50, 52 and 54 correspond to relays 58, 60, 62 and 64, respectively, and their output causes the interlocks of the relays associated therewith to close similarly as does rectifier 46 close that of relay 56. Each of the relays 56 through 64 is calibrated so as to close at a different axle generator voltage and current which, of course, is reflective of the traction motor speed. For example, relay 56 may be calibrated to pick up at perhaps eight miles per hour and drop out at seven miles per hour, corresponding to a predetermined axle generator voltage and current. Similarly, relay 58 may be calibrated to pick up at ten miles per hour and drop out at nine miles per hour; relay 60 may be calibrated to pick up at twelve miles per hour and drop out at eleven miles per hour; relay 62 to pick up at fourteen miles per hour and drop out at thirteen miles per hour; and relay 64 to pick up at sixteen miles per hour and drop out at fifteen miles per hour. Although these choices of relay pick up and drop out may be arbitrary and for purposes of illustration only, it will be appreciated that the relays are energized to pick up and deenergized to drop out at certain speeds which represent incremental increases and decreases corresponding to incremental increases and decreases in traction motor speed. Energization of relay 56 causes closure of its interlock for energization of an air magnet valve MV1. The circuit for accomplishing energization of air magnet valve MV1 begins with battery BAT and includes wire 8, wire 65, now closed interlock of relay 56, wire 67, the energizing coil of air magnet valve MV1 and a return to ground GR. Energization of magnet valve MV1, which is a conventional type of solenoid operated magnet valve, causes closure of its valve to close off the communication between a passage 66 and a passage 68 returning to the sump side of a hydraulic pressure source PS generated by the engine E. It will be observed that the passage 66 communicates via a port 70 with the chamber 14 of servo 10. Hydraulic fluid under pressure is supplied from pressure source PS via passage 72 to chamber 14. When magnet valve MV1 is deenergized (relay 56 dropped out) piston 16 will be maintained in approximately the position shown since if piston 16 moves against spring 20 much beyond the position shown, the hydraulic fluid supplied through the passage 72, chamber 14 may return via port 70 and passage 66, magnet valve MV1 and passage 68 to the sump side of the pressure source PS. With piston 16 in the position shown even though the throttle is fully open the linkage 30, 32, 34 will limit the horsepower of the engine to what may be established as the safe maximum for vehicle (motor M) speeds from 0 to say 8 miles per hour. If the vehicle speed exceeds 8 miles per hour, relay 56 will, of course, pick up. As already mentioned, when relay 56 picks up it energizes air magnet valve MV1 which closes off the communication between passage 66 and return passage 68. Closure of communication between passages 66 and 68 has the effect of closing the port 70 so as to prevent any of the hydraulic fluid under pressure in the chamber 14 from passing through passage 66 to the return passage 68. This will, of course, cause the pressure acting on the face of piston 16 to move it further to the left as viewed in the drawing against the opposing action of spring 20 to thereby fore-shorten the linkage 30, 32 and 34 and increase the fuel supply available to the engine at full throttle and the engine horsepower output to a new safe maximum for say vehicle speeds between 10 miles per hour and 12 miles per hour.

Again it is emphasized that relay 56 picks up at a certain low speed and relays 58, 60, 62 and 64 pick up on corresponding incremental increases in speed so that these relays pick up and drop out sequentially as the speed increases and decreases. In other words, if the speed of the vehicle (traction motor M) should now increase beyond the point at which relay 56 is picked up and to the point at which relay 58 is also picked up, the interlock of relay 58 will also close. Closure of the interlock of relay 58 will energize magnet valve MV2. This is accomplished by current flow through wires 8 and 74, closed interlock of relay 58, wire 76 of the energizing coil of magnet valve MV2, leading to ground GR. Energization of magnet valve MV2 will cause its valve to close, thereby closing off communication between passages 78 and 68 in a manner similar to the manner in which magnet valve MV1 closed off the communication between passages 66 and 68.

Closure of magnet valve MV2 to cut off the communication between passage 78 and return passage 68 will cause piston 16 to move further to the left as viewed in the drawing under the action of the hydraulic fluid under pressure in chamber 14, so as to actuate turnbuckle 30 and further foreshorten linkage 30, 32 and 34 and further increase engine power. This progressive action has relays 60, 62 and 64 also sequentially picked up upon incremental increases in motor speed and will likewise cause energization of magnet valves MV3, MV4 and MV5, respectively, to further move piston 16 to the left and further fore-shorten linkage 30, 32 and 34 and further increase the availability of engine power at full throttle until the normal full throttle horsepower is attained. Similarly, as the vehicle slows down and the traction motor speed decreases, the magnet valves will drop out in reverse order with magnet valve MV5 dropping out first, magnet valve MV4 dropping out second, magnet valve MV3 dropping out third, magnet valve MV2 dropping out fourth, and magnet valve MV1 dropping out last, to thereby allow piston 16 to move to the right as viewed in the drawing under the action of spring 20 and increase the effective length of linkage 30, 32 and 34 and consequently decrease the engine power available at full throttle. It should be observed at this point that if the control system should fail, it will fail "safe" i.e., the piston 16 on servo 10 is always biased to the right or in the power decreasing direction so as to protect against overheating of the traction motors and wheel slip.

It is, of course, understood that the control described herein may be used for other engine throttle settings if desired. This horsepower reduction control system is applicable to any power plant and can be used on diesel, gasoline, gas or steam engines in single or multiple control systems, mobile or stationary, or wherever a reduction in horsepower is needed to protect the transmission equipment from overload or overspeeds. As previously mentioned, the actuating means is not limited to axle driven generators. Any device, whether it is centrifugal, hydraulic, pneumatic or electrical, can be used to actuate the hydraulic control piston and rack. The particular method chosen here is, of course, electrically actuated. It will be noted that it is fully automatic and is designed to control engine horsepower output by moving the power piston of a conventional governor to any predetermined power setting.

I claim:

In a locomotive power train including a throttle controlled prime mover having a linkage between the throttle and fuel supply thereof, an electrical generator driven by said prime mover, and a traction motor connected across said generator; means to automatically limit the power output of said prime mover independently of the throttle settings thereof when the speed of said motor is less than a predetermined speed comprising means in said linkage to vary the effective length thereof, a servo motor including an elongated cylindrical chamber having a piston reciprocable therein operatively connected to said last mentioned means, biasing means acting on said piston, a pressure source connected to said chamber at one end thereof and acting on said piston is opposition to said biasing means, a plurality of exhaust ports along the length of said chamber including valve means normally connecting said ports to exhaust, and means operatively connected to said valve means responsive to progressive increases in motor speed below said predetermined speed to cause said ports to sequentially close and said piston to move in response to the pressure thereagainst to vary the effective length of said linkage.

References Cited in the file of this patent

UNITED STATES PATENTS

| | | |
|---|---|---|
| 2,179,283 | Deeg | Nov. 7, 1939 |
| 2,428,574 | Lentz | Oct. 7, 1947 |
| 2,431,145 | Staples et al. | Nov. 18, 1947 |
| 2,478,135 | Stephens | Aug. 2, 1949 |
| 2,588,627 | Hefel | Mar. 11, 1952 |